United States Patent

[11] 3,627,378

[72] Inventor Kenneth E. Brock
 3084 West Ball Road, Anaheim, Calif. 92804
[21] Appl. No. 45,853
[22] Filed June 12, 1970
[45] Patented Dec. 14, 1971

[54] SEAT FUEL TANK
 8 Claims, 3 Drawing Figs.
[52] U.S. Cl. ............................................. 297/194
[51] Int. Cl. ............................................. A47c 7/62
[50] Field of Search .................................. 297/188, 191, 192; 244/135; 280/5 A, 5 F

[56] References Cited
 UNITED STATES PATENTS
 2,758,845  8/1956  Doyle et al. ............... 280/5 A
 2,824,602  2/1958  Collins et al. ............. 297/458
 2,989,115  6/1961  Egles ....................... 297/217
 FOREIGN PATENTS
 944,530  6/1956  Germany ..................... 280/5 A
 162,609  3/1958  Sweden ...................... 280/5

Primary Examiner—James T. McCall
Attorney—Lyon & Lyon

ABSTRACT: A fuel tank, intended particularly for lightweight aircraft or sports vehicles, which is constructed in the shape of a seat; the tank comprising a rearward and underlying component and a complementary forward and overlying component which are joined together around their margins to form a hollow seat structure, there being a reinforcing member within the tank secured to the forward and overlying component and exposed fastening means for attaching the seat fuel tank to a vehicle.

PATENTED DEC 14 1971 3,627,378
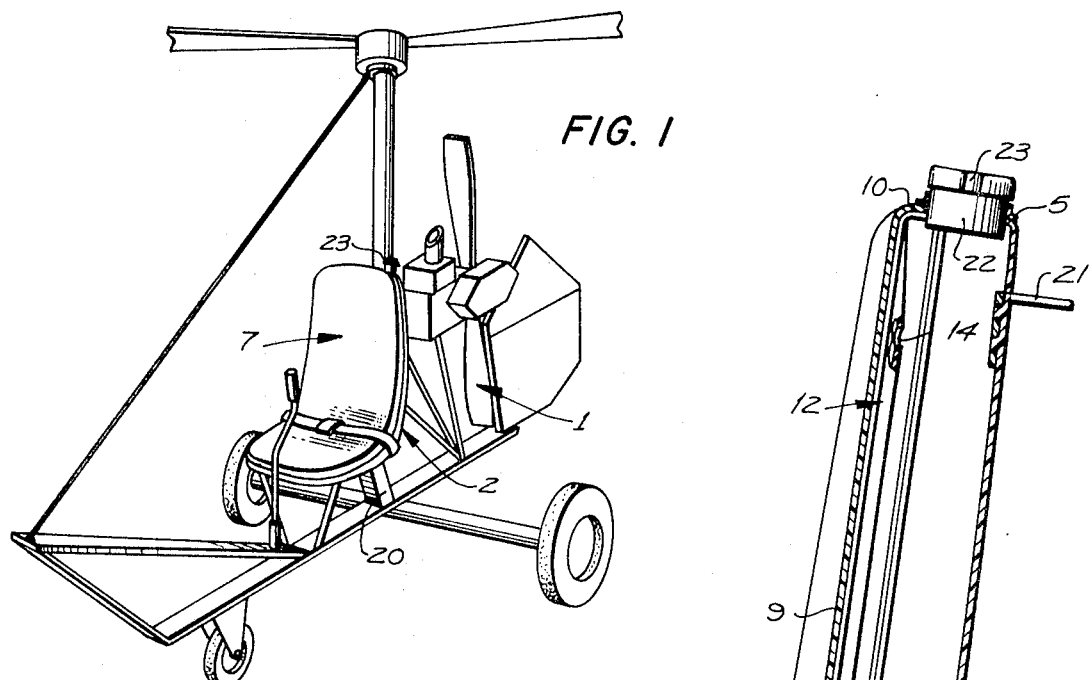
FIG. 1
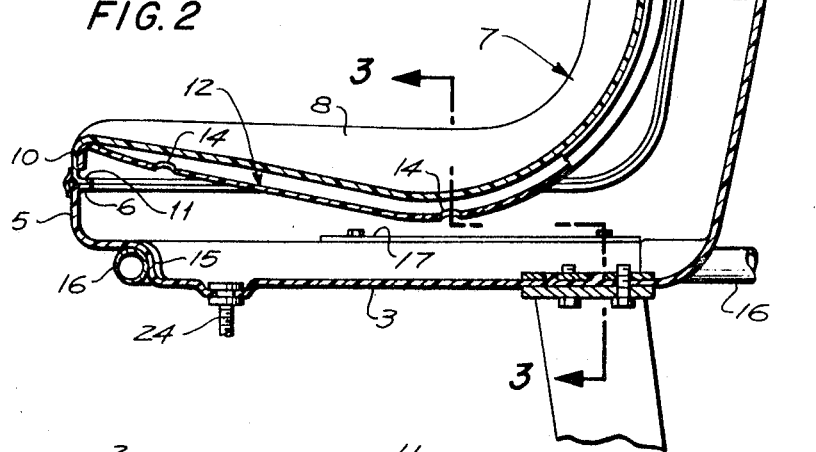
FIG. 2
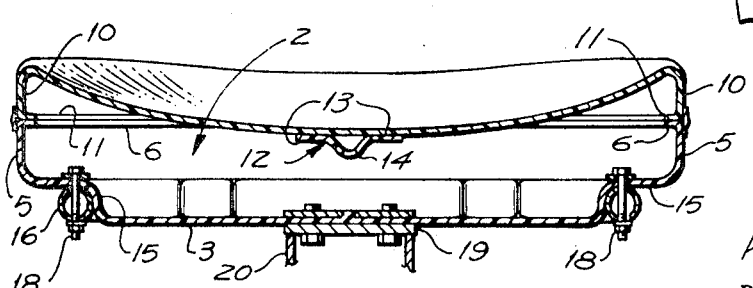
FIG. 3
INVENTOR.
KENNETH E. BROCK
BY
ATTORNEYS

3,627,378

SEAT FUEL TANK

BACKGROUND AND SUMMARY OF THE INVENTION

It has been proposed, as disclosed in U.S. Pat. No. 3,098,633, to construct a fuel tank which may be secured to a passenger seat of an aircraft so that when the aircraft has less than the full complement of passengers, the fuel tank may be temporarily strapped in the empty seat to extend the range of the aircraft. Such tanks usually must be designed to be jettisoned as they are too bulky to be transported when not in use. Also, such tanks cannot be used by single-occupant aircraft or land vehicles.

The present invention is directed to a fuel tank which also serves as a seat, and is summarized in the following objects:

First, to provide a seat fuel tank which is particularly adapted for use under exposed conditions such as on small gyrocopters and helicopters or other aircraft wherein the pilot is exposed, as the seat fuel tank when occupied adds virtually no wind resistance beyond the wind resistance created by the pilot himself.

Second, to provide a seat fuel tank which is particularly simple and inexpensive to manufacture and has minimal weight; the seat fuel tank comprising two complementary components, a bottom and back side component and a top and front side component, the two components being joined by their side margins.

Third, to provide a seat fuel tank which may serve as an auxiliary tank as well as a passenger seat and used for fuel whether the seat is unoccupied or occupied.

Fourth, to provide a seat fuel tank which, while particularly adapted for small aircraft, is also adapted for use with small sports land vehicles wherein the driver or driver and passenger ride exposed.

DESCRIPTION OF THE DRAWINGS

FIG. 1 is a substantially diagrammatical perspective view of a gyrocopter, showing the seat fuel tank mounted thereon.

FIG. 2 is a longitudinal sectional view of the seat fuel tank.

FIG. 3 is a transverse sectional view thereof, taken through 3—3 of FIG. 2.

The seat fuel tank is intended primarily for use with small aircraft such as the gyrocopter 1 illustrated in FIG. 1, helicopters or other aircraft where the pilot is exposed rather than seated within a fuselage. The seat fuel tank is also applicable to ground vehicles where the driver is similarly exposed.

The seat fuel tank includes an underlying component 2 formed of lightweight sheet material such as fiber glass. The underlying component includes an essentially horizontal bottom portion 3 joined to an upright rearward portion 4. The two portions are provided at their remote extremities and sides with a common peripheral wall 5 which extends upwardly from the bottom portion 3 and forwardly from the upright portion 4. The peripheral wall terminates in an inturned marginal flange 6.

The seat fuel tank also includes an overlying component 7, also formed of lightweight sheet material such as fiber glass. The overlying component includes a seat portion 8 which overlies the bottom portion 3 and an upright forward portion 9 disposed forwardly of the rearward portion 4. The extremities of the portions 8 and 9 and their sides are provided with a common peripheral wall 10 terminating in an inturned marginal flange 11.

The walls 5 and 10 are dimensioned and contoured so that their respective flange 6 and 11 confront each other and are adapted to be cemented together so that the two components 2 and 7 form a sealed container or tank.

The overlying component 7 is provided with a hollow reinforcing rib 12, preferably formed of fiber glass, and centered between the lateral sides of the overlying components. The reinforcing rib extends between the extremities of the seat portion 8 and the forward portion 9 and is provided with side flanges 13 which are cemented to the overlying component 7. The reinforcing rib is provided with perforations 14 so located that liquid may readily flow into or out of the space between the rib 12 and the adjacent wall of the overlying component 7.

The bottom portion of the underlying component 2 is provided at its lateral sides and front side with a marginal shoulder 15 against which is fitted a U-shaped mounting tube 16 which is secured in place by fastening strips 17 within the bottom portion and fasteners such as bolts and nuts 18 extending into or through the mounting tube. Alternatively, or in addition to the mounting tube the bottom portion 3 may be provided with a mounting plate 19 for attachment to the frame 20 or other part of the gyrocopter or other vehicle. In addition, the upright rearward portion 4 may be provided with outwardly extending mounting brackets 21. In each instance, the openings through which parts protrude from the underlying component are completely sealed.

A filler opening 22 is provided at the top end of the upright rearward portion 3 and receives a cap 23. A suitable fuel outlet 24 is provided in the bottom portion 3.

The seat portion 8 and back portion 9 are made concave to conform to the human body and may be covered with padding, not shown.

While particular embodiments of this invention have been shown and described, it is not intended to limit the same to the details of the constructions set forth, but instead, the invention embraces such changes, modifications and equivalents of the various parts and their relationships as come within the purview of the appended claims.

I claim:

1. A seat fuel tank comprising:
    a. a single-piece underlying component including a horizontal portion, an integral upstanding portion and a continuous integral upwardly and forwardly directed peripheral wall common to said portions;
    b. a single-piece overlying component including a horizontal portion, an integral upstanding portion and a continuous integral downward and rearwardly directed peripheral wall common to said portions;
    c. the peripheral walls of the two components being in mutual engagement and sealed together thereby to form a closed tank;
    d. the horizontal portion of the overlying component being contoured to form a seat, the upstanding portion being contoured to form a backrest and the connecting regions of the two portions being curved to form a transition zone between the seat and backrest.

2. A seat fuel tank, as defined in claim 1, wherein:
    a. the mutually engaging portions of the peripheral walls are confronting flanges.

3. A seat fuel tank, as defined in claim 1, wherein:
    a. at least one hollow perforated rib is secured within the overlying component and extends between the extremities of the horizontal and upstanding portions.

4. A seat fuel tank, as defined in claim 1, wherein:
    a. The horizontal and upstanding portions of the underlying component are provided with mounting means.

5. A seat fuel tank comprising:
    a. a hollow essentially L-shaped sealed tank structure; including an upwardly facing horizontal portion and a forwardly facing upstanding portion;
    b. said portion being transversely concave and contoured at their juncture to form a seat and backrest;
    c. an inlet to the tank structure at the upper end of the upstanding portion;
    d. and an outlet from the tank in the horizontal portion.

6. A seat fuel tank, as defined in claim 5, wherein:
    a. the structure includes two complementary components having continuous sidewalls bordering the horizontal portion and upstanding portion, the walls being sealed together.

7. A seat fuel tank comprising:
    a. a hollow essentially L-shaped sealed tank structure, including an upwardly facing horizontal portion and a forwardly facing upstanding portion;

b. said portions being transversely concave and contoured at their juncture to form a seat and backrest;
c. an inlet to the tank structure at the upper end of the upstanding portion;
d. an outlet from the tank in the horizontal portion;
e. and a hollow perforated reinforcing rib disposed within the tank structure and extending between the extremities of the seat and backrest.

8. A seat for an open, lightweight, engine-powered aircraft such as a gyrocopter, the improvement comprising,
a. a hollow essentially L-shaped structure comprised of spaced L-shaped components joined in sealed relationship,
b. one L-shaped component having an upwardly facing exterior horizontal portion and a forwardly facing exterior vertical portion,
c. said portions being transversely concave and shaped to form a contoured seat,
d. an inlet located at the upper end of the L-shaped structure for filling the structure with fuel,
e. a removable closure element on said inlet,
f. and an outlet in the lower portion of the L-shaped structure adapted to connect to means for supplying fuel to the aircraft engine.

* * * * *